(12) United States Patent
Coffin (10) Patent No.: US 8,860,947 B2
(45) Date of Patent: Oct. 14, 2014

(54) DUAL INPUT INTERFEROMETER BEAMSPLITTER TILT CONTROL SYSTEM AND FLEXURE MOUNTING

(75) Inventor: John Magie Coffin, Blue Mounds, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 607 days.

(21) Appl. No.: 12/944,428

(22) Filed: Nov. 11, 2010

(65) Prior Publication Data

US 2012/0120409 A1    May 17, 2012

(51) Int. Cl.
*G01B 11/02* (2006.01)
*G02B 27/10* (2006.01)
*G01B 9/02* (2006.01)
*G01J 3/453* (2006.01)

(52) U.S. Cl.
CPC ............ *G01J 3/453* (2013.01); *G02B 27/1013* (2013.01); *G02B 27/10* (2013.01); *G01B 9/02068* (2013.01)
USPC .......................................... 356/496; 356/498

(58) Field of Classification Search
USPC ................... 356/450, 451–453, 496–510
See application file for complete search history.

(56) References Cited

U.S. PATENT DOCUMENTS

| | | | |
|---|---|---|---|
| 4,480,914 A * | 11/1984 | Thompson et al. | 356/452 |
| 5,239,361 A | 8/1993 | Burch | |
| 5,657,122 A * | 8/1997 | Curbelo et al. | 356/452 |
| 5,689,337 A * | 11/1997 | Lamb et al. | 356/510 |
| 5,883,712 A | 3/1999 | Coffin | |
| 6,229,614 B1 * | 5/2001 | Larsen | 356/451 |
| 6,822,779 B2 * | 11/2004 | Chi | 359/290 |
| 6,967,722 B2 * | 11/2005 | Manning | 356/452 |
| 7,388,700 B1 * | 6/2008 | Odhner | 359/224.1 |
| 2008/0013097 A1 * | 1/2008 | E. del Puerto | 356/500 |
| 2008/0291426 A1 * | 11/2008 | Azimi et al. | 356/51 |

FOREIGN PATENT DOCUMENTS

WO    WO 98/02720 A1    1/1998

* cited by examiner

*Primary Examiner* — Tarifur Chowdhury
*Assistant Examiner* — Hina F Ayub
(74) *Attorney, Agent, or Firm* — Ion Cristian Abraham (57) ABSTRACT

A novel soft beamsplitter mounting system as part of an interferometer to protect the beamsplitter substrate from external stresses and thus preserve optical flatness is introduced. The soft mounting system enables such protection by being more flexible that the beamsplitter substrate so external forces deforms the mount rather than the beamsplitter. Although the soft beamsplitter mounting configurations disclosed herein protects the beamsplitter, the interferometer itself is less stable because the mounts of the present invention allows the beamsplitter to tilt more easily than other components held in the interferometer. The improved tilt control embodiments of the present invention turns this seemingly deleterious effect into a cost saving benefit by using the inexpensive soft mounting system as a flexure to allow an improved active control system to maintain tilt alignment in a system that is more rugged than conventional interferometers.

22 Claims, 3 Drawing Sheets

DUAL INPUT INTERFEROMETER BEAMSPLITTER TILT CONTROL SYSTEM AND FLEXURE MOUNTING

BACKGROUND OF THE INVENTION

1. Field of the Invention

The present invention relates to the field of optical scientific instrumentation. More specifically, the present invention relates to a dual tilt control system that includes a soft flexure beamsplitter assembly as incorporated in a Fourier-Transform infrared (FTIR) scanning interferometer.

2. Discussion of the Related Art

An optical interferometer used in a scientific analytical instrument relies on the interference of superimposed optical beams as part of the interrogation means. When configured as a Michelson Fourier-Transformed infrared (FTIR) instrument, the optical output of the interferometer is called an interferogram. The FTIR interferometer itself often includes a beamsplitter and two mirrors, one that is conventionally stationary, and one which is conventionally mobile. The mobile mirror moves along the optic axis while staying optically perpendicular to the light beam at all times. The movement of the mobile mirror is often desired to be feedback controlled in order to hold the mirror velocity constant so that the analytical radiation that passes through the interferometer produces an accurate interferogram. Conventional interferometers have a moving mirror assembly that includes a linear ball bearing, air bearing, slide bearing, or a flexure bearing and is often driven by a linear motor (e.g., a coil coupled to a permanent magnet) to provide velocity control.

Motion and a resultant velocity of the mobile mirror in a conventional system can be tracked by a positioning monochromatic beam of optical radiation operating in conjunction with the analytical radiation beam passing through the interferometer optics. The configured monochromatic beam (e.g., laser) is thus also often partially reflected and partially transmitted through the configured beamsplitter of the interferometer, and because of the design, the split beams are reflected from the conventionally fixed mirror and the conventionally mobile mirror and recombined at the beamsplitter.

The recombined beams at the beamsplitter are thereafter directed to a detection means that can thereby determine the tilt, position, and/or velocity of the mobile mirror along its longitudinal translation axis. With respect to tilt, the deviations in the phases of the components of the recombined beams can be used to indicate a misalignment of the mobile mirror with respect to a perpendicular of the designed longitudinal axis for the optical element. If such deviations are deleterious, a tilt servo controller can apply corrective forces to the support of the mobile mirror so as to realign the face of the mirror.

However, it is to be appreciated that because the angle of the beamsplitter is often designed to bisect the angle of configured mirrors that help modulate the source beam, if either of the mirrors or the beamsplitter tilts away from the correct angle, the modulated light signal generated by the interferometer can be quickly degraded. Tilt errors that are more than about 50 arc seconds not only reduce the quality of the modulated light signals but tilt errors larger than 50 arc seconds also causes the modulated light signals to reduce in magnitude to the point of effectively disappearing, causing the interferometer control system to stop operating.

Thus, conventional systems are often configured to be precisely aligned with mechanical adjustments that must stay correctly adjusted even if the system is shipped around the world. This has resulted in expensive stiff precision mechanical interferometer systems that sometimes need adjustments in the field after shipping shocks has shifted the alignment of the critical flat optical surfaces.

In operation, many of such conventional systems use active control systems (i.e., dynamic alignment) to control mirror and beamsplitter tilt as the interferometer scans and collects a desired spectral data. Such systems can only operate if the interferometer is scanning under the control of a laser based velocity control servo that all typical scanning interferometers use. Thus, the static alignment of the interferometer is called upon to be good enough at less than about 50 arc seconds to produce useable optical feedback signals before any active control system(s) can be utilized to control interferometer scan speed, tilt error and then data collection.

Background information on a similar interferometer system that utilizes conventional laser based control servos, is described and claimed in, U.S. Pat. No. 5,883,712, entitled, "INTERFEROMETER OF AN INFRARED SPECTROMETER WITH DYNAMIC MOVING MIRROR ALIGNMENT" issued Mar. 16, 1999, to John M. Coffin, including the following, "[i]n accordance with the present invention, an interferometer for an infrared spectrometer provides dynamic alignment of the moving mirror to maintain precise alignment between the moving mirror and the fixed mirror. The alignment of the moving mirror in this manner maximizes the stability of the interferometer while achieving high levels of output accuracy despite vibrations due to the movement of the moving mirror on its bearings and vibrations transmitted from external sources to the interferometer. The dynamics of the mounting of the moving mirror allow the position of the mirror to be controlled with high accuracy even in the presence of relatively high frequency vibrations. The structure of the interferometer and of the detectors and controls for maintaining the alignment of the moving mirror are nonetheless simple in construction and contribute relatively little additional bulk or weight to the interferometer."

Accordingly, the present invention addresses the need for an inexpensive beamsplitter mounting assembly that simultaneously preserves the optical flatness of the coupled optical components configured in an interferometer instrument. To provide for time efficient and reliable data when incorporating such soft mounting configurations, the present invention is also directed to an improved tilt control system that includes combining a wide range dynamic tilt control system with a phase measurement tilt control system so as to maintain beamsplitter alignment over a large range of tilt errors that, as a system, is more rugged than typical interferometer instruments.

SUMMARY OF THE INVENTION

The present invention provides a novel interferometer system that includes a first plane reflector configured to respectively receive and return a first portioned beam of a source along a first optical path length; a second plane reflector configured to respectively receive and return a second portioned beam of the source along a second optical path length; a resiliently mounted beamsplitter for receiving a beam of radiation from the source so as to provide the first and the second portioned beams; a movement means coupled to the resiliently mounted beamsplitter to provide a velocity and position control and/or a tilt control about a configured X and Y axes of the resiliently mounted beamsplitter; and a dual input control means for providing a controlled feedback to the movement means to enable the velocity and position control and/or a combined the tilt control about the configured X and Y axes so as to align one or more predetermined flat surfaces in the interferometer, and wherein the velocity and position control and/or the tilt control of the movement means further enables optical path length differences between the first optical path length and the second optical path length that in combination provide an interrogating interferogram of the input source beam radiation at a configured exit of the interferometer.

Another aspect of the present invention provides for a flexure mounted moving beamsplitter assembly that includes a beamsplitter substrate; a resilient membrane configured coupled about the periphery of the beamsplitter substrate and further coupled to a support structure; wherein the resilient membrane minimizes induced external stresses directed through the support structure and thus aids in preserving optical flatness; a plurality of magnetic means coupled to a predetermined surface of the beamsplitter substrate; and a plurality of coils configured to couple matched and/or mismatched predetermined magnetic forces with the plurality of magnetic means, wherein the matched and/or mismatched predetermined magnetic forces enables linear and/or tilting movements of the beamsplitter substrate.

Accordingly, the present invention, as described herein, provides for a novel soft beamsplitter mounting system that protects the beamsplitter substrate, as configured in an interferometer, from external stresses so as to the preserve optical flatness of the relatively soft material. However, although such a soft beamsplitter mounting configuration protects the beamsplitter substrate, the interferometer itself is less stable because the mounts of the present invention allows the beamsplitter to tilt more easily than other components held in the interferometer. Thus, the present invention combines an improved dual tilt control system to overcome the instabilities resultant from the inexpensive soft mounting system to provide for an overall rugged instrument.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The beamsplitter assembly for many interferometer systems often includes one or two similar transparent optical substrates; one being the substrate which can be coated on one of the surfaces. The other substrate is used as a compensator plate mounted next to the coated side of the adjacent beamsplitter. The compensator is often designed to have the same amount of optical path length as the beamsplitter to provide the best quality spectral data. It is often found that because such substrates for the assembly itself are manufactured from soft materials, such as, potassium bromide (KBr), such substrates are susceptible to damage, especially during handling and shipping. To prevent tilt alignment problems over time, the optical beamsplitter assembly materials are often held rigidly in place with strong precision machined parts that are expensive to manufacture but nonetheless provide for the accuracies required for operation of the instrument. The problem is that such rigid mounting often induces external stress (s) that can warp the beamsplitter as well as the compensator plate, which destroys the optical flatness of the elements and thus necessarily affects the performance of the overall instrument.

One of the beneficial aspects of the present invention is that instead of rigid mounting, the invention disclosed herein utilizes an inexpensive novel soft beamsplitter mounting assembly that protects the configured beamsplitter and compensator plate from damage caused by external stress(es) transmitted and caused by the supporting mechanism. The soft mounting described herein enables protection of the optical elements by being more flexible than the held structures so as to direct the stress(s) in a manner to deform the mount rather than the optical elements.

However, it is to be noted that while the inexpensive novel soft beamsplitter mounting system protects the optical flatness of the optical elements in the assembly, it also can make the interferometer less stabile because the mounting configuration allows for the beamsplitter portion of the assembly to tilt more easily due to the soft mounts being capable of drifting with time and temperature changes as compared to other parts of the instrument, especially during shipping.

However, the improved design of the present invention negates this deemed deleterious effect by coupling the same flatness protecting soft flexure mounting system of the present invention with an active motion control system, as disclosed herein, that maintains improved tilt alignment as well as controlled velocity so as to provide for a beneficial cost saving system that is additionally rugged in operation. In particular, the active motion control system of the present invention is configured to beneficially cooperate with the novel soft flexure mounting of the present invention via operation as a dual input tilt control and detection system that includes: summing the tilt measurement signals from both a wide angle (auto-collimation) system and an optical (e.g., laser) phase tilt measurement system so as to capture the best features of stability and reliability of both tilt control systems.

The resultant combined tilt measurement system provides for a wider operating range of beamsplitter tilts (e.g., from about 20 arc seconds up to more than 10,000 arc seconds) that can often result from, but not necessarily, the soft resilient mounting structures disclosed herein. Such a wide range tilt control system of the present invention is designed to work even if the optical laser velocity control signal is lost because of the induced larger tilt errors. Moreover, the wide range tilt control system, as detailed herein, can be turned on and be operational in less than about 1 second, even if the velocity servo is not turned on.

It is notable that the allowable tilt error of the wide control range control system, as disclosed herein, is also adjustable. If the detector, as also described herein, is mounted close to the beamsplitter of the present invention, the tilt error angles can be very large (e.g., 10,000 arc seconds or more) before the optical spot moves far enough on the detector to miss the detector so as to stop the measurement system form working. On the other hand, if the light detector is moved farther away, the total range of tilt measurement decreases because the optical spot moves off of the monitoring detector with less beamsplitter tilt. However, the tilt measurement output signal gets larger for a given error so as to reduce measurement error. Such a wide range of adjustability gives the designer greater flexibility in the use of the wide range tilt measurement system of the present invention.

The active tilt motion control of the beamsplitter tilt is aided by the use of at least three coupled movement means (e.g., solid light weight magnets (e.g., about 10 grams per magnet)), often four coupled magnets configured at about 90 degree radial positions on the beamsplitter. Such magnetic devices are thus capable of being induced to provide controlled tilt movements for the beamsplitter via adjacent configured coils that are utilized to direct mismatched magnetic as well as matched magnetic forces if desired to respective magnets. Beneficially, since the movement means, such as, magnets are coupled at small areas at the edges of the beamsplitter substrate, the means themselves cannot couple uncontrolled outside forces caused by shock, temperature changes, etc., that can warp the optical active part of the beamsplitter. Moreover, because of the configuration of the chosen magnetic movement means, only small controlled forces are generated by the magnets when placed near magnetic inducing coils of wire. As a result, such generated forces are also too small to warp the beamsplitter.

Thus, the novel soft flexure beamsplitter and coupled movement means arrangements, in addition to the disclosed tilt control systems disclosed herein, enable for an improved mounting configuration and wide range measurement system that can reliably measure and correct larger tilt error angles in a time efficient novel fashion. Such an improved tilt measurement system also works at any velocity allowing dynamic alignment to be operational before the velocity control system is even turned on.

Surprisingly, such an arrangement also allows the total long term tilt error of all the mechanical parts of the interferometer instrument to be about at least 100 times greater than thought of as being tolerable and yet still correctable to produce large monitoring signals to be induced within one second of powering up the interferometer control system.

Specific Description

Soft Flexure Mount Assembly

Figure 1A:
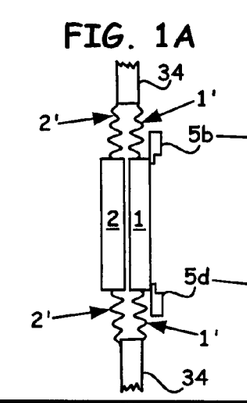
FIG. 1A shows a side view perspective of a beneficial flexure mounted beamsplitter 1/compensating plate 2 assembly.

Turning now to the figures, FIG. 1A shows a side view of a beneficial beamsplitter 1/compensating plate 2 configuration that is utilized in each of the disclosed system embodiments to be discussed herein. With respect to FIG. 1A, the novel beamsplitter 1/compensating plate 2 of the present invention is shown with each optical component having respective coupled resilient membrane flexures 1', 2' affixed to a support 34 mounting member. The Beamsplitter 1 component is also shown coupled to magnetic movement means 5b and 5d (reference character 5b' and 5d' relate to the drive coils discussed below with respect to the example circuit FIG. 1C) so as to enable precision individual movement of the beamsplitter 1 portion.

Figure 1B:
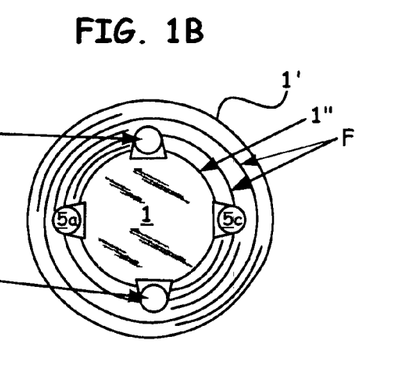
FIG. 1B shows a front view of the flexure mounted beamsplitter portion of FIG. 1A.

FIG. 1B shows a front view of the beamsplitter 1 portion of FIG. 1A to give the reader a different perspective of the coupling configuration of beamsplitter 1 with the resilient material 1' (e.g., diaphragm membrane flexure) about its periphery as well as the velocity drive and tilt means (e.g., the coupled magnets, as denoted by the reference characters 5a, 5b, 5c, and 5d). Details of the structure and method of operation of the diaphragm flexure with respect to dynamic velocity control of the moving beamsplitter described herein, is disclosed in Co-pending, Co-filed U.S. application Ser. No. 12,944,512 titled "INTERFEROMETER VELOCITY CONTROL OF BEAMSPLITTER AND MOVING MIRRORS," by Coffin et al., the disclosure of which is herein incorporated by reference in its entirety.

It is to be appreciated that the resilient diaphragm-like flexure configuration 1', as better illustrated in FIG. 1B, is often but not necessarily constructed with thicknesses of up to about 0.5 mm and from beneficial materials, such as, but not limited to, polymers, plastics, Mylar, metals, paper, etc. As a beneficial embodiment, the diaphragm-like flexure 1' can be configured from low cost fabric, such as, but not limited to Kevlar, as commonly found in loudspeakers. In addition, such resultant resilient diaphragm flexures 1', 2' can be permeated (e.g., with varnish) or treated with materials to also further tailor the stiffness and thus the resultant desired movements of the beamsplitter 1 and/or compensator plate 2 optical components. If needed, the resilient diaphragm-like flexures 1' and 2', as shown in FIG. 1A, can also be designed with several folding lines, e.g., corrugations, (denoted by the letter F, as shown in FIG. 1B), to reinforce the resultant flexures while also providing the desired rigidity/resiliency and thus controlled deformations in all directions so as to aid in movement of the beamsplitter 1 while still fully protecting the optical flatness of the held substrate(s).

Such a resultant structure can thus beneficially deform and bend a large amount at up to about 5 millimeters and still have sufficient elasticity to spring back to the original position after shocks have been experienced. It is important to note that if the center of mass and the center of rotation of a mirror or a beamsplitter mount are not matched, then as the force of gravity changes as the interferometer is moved to a different orientation or the interferometer experiences acceleration forces caused by floor shake and vibration, the offset in the center of mass and center of rotation can generate torque(s) that result in undesired tilt of the held optical component. Such an unwanted tilt must then be corrected to get the best performance. Accordingly, the diaphragm flexures 1', 2' pivot points of the present invention is beneficially designed to be coupled to beamsplitter 1 at a position, for example, substantially at the same position as the center of mass of moving beamsplitter 1 so as to eliminate or minimize outside vibration from tilting a mirror or a moving beamsplitter mounted in a fashion described herein.

As an additional benefit, it is also to be appreciated that such flexure types of bearings have been found in utilization with the present configurations to have low velocity error or noise because the bending action of the flexures is very smooth due to the fact there is no sliding or rolling bearing action. This is important because no practical surface is truly smooth; therefore rolling and sliding bearings, in contradistinction to the flexure bearing configurations presented herein, always add velocity error noise as the non smooth parts slide or roll past each other.

Coupling the beamsplitter 1 to the resilient flexure material 1' about its periphery (as described below) after engaging beamsplitter 1 through a central opening 1", as shown in FIG. 1B, makes it possible to move the beamsplitter 1 in a linear (flexure material 1' also provides a retarding force) and/or tilting fashion when induced by applied magnetic forces to magnetic movement means 5a, 5b, 5c, and 5d. Coupling the beamsplitter 1 substrate within central opening 1", is often, but not necessarily, enabled by fixing (e.g., gluing) in place the substrate with a thin bead (not shown) of an adhesive material. Beneficially, the effective amount of adhesive material is thinner than the substrate and thus geometrically weaker. Because the adhesive is geometrically weaker, the stresses that can build up due to temperature changes and as it cures, cannot warp the thicker and stronger substrate.

Moreover, the flexure diaphragms 1', 2', as shown in FIGS. 1A and 1B, are by design weaker and less stiff than the optical substrates configured therein. Such a flexible arrangement beneficially holds beamsplitter 1 and allows movement as the external 34 mounting member experiences, for example, shock while the instrument is in transit. The thin flexible flexure diaphragms 1', 2' thus limits the stress levels in the optical beamsplitter 1 substrate material because the mounting configuration is, as stated above, weaker than the substrate itself. In addition, much like the discussion above with respect to the use of adhesive coupling material, if there is stress which occurs because of temperature changes or additive adhesive shrinkage, the weaker and less stiff flexure diaphragms 1', 2', deforms, still leaving the optical materials flat.

Figure 1C:
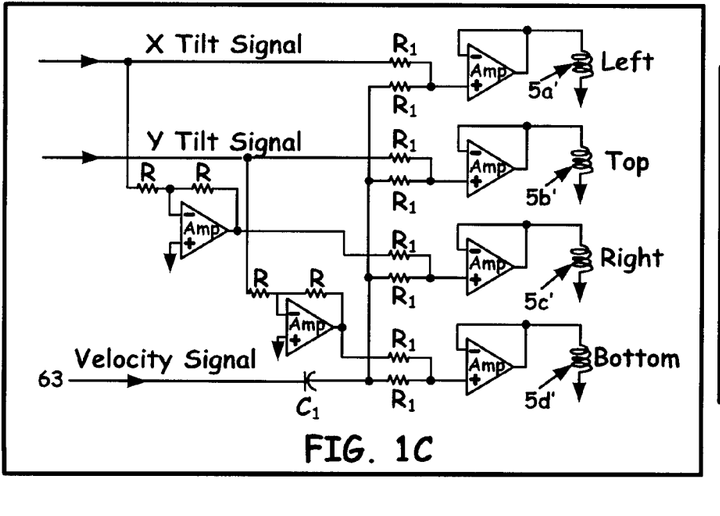
FIG. 1C shows an example resistor matrix and coupled operational amplifiers circuit that can be used to provide the desired velocity and/or tilt movements for the flexure mounted beamsplitter configurations of the present invention.

The tilt of the moving beamsplitter 1 can be controlled by using the same one or more movement means, e.g., predetermined sized magnets 5a, 5b, 5c, and 5d, and coils (e.g., 5a', 5b', 5c', and 5d', as shown in FIG. 1C) that are used to also control the velocity of the optical element as described in the above mentioned Co-pending and Co-filed U.S. application titled "INTERFEROMETER VELOCITY CONTROL OF BEAMSPLITTER AND MOVING MIRRORS. Coupling of the magnets 5a, 5b, 5c, and 5d to the beamsplitter 1 can be by any means known to those skilled in the art, such as, for example, an epoxy-like/glue adhesive. Since the magnets 5a, 5b, 5c, and 5d are light (less than 10 grams) and small, the attachment areas to the beamsplitter 1 are also correspondingly small so that any adhesive shrinkage only affects an unimportant area at the edge of the beamsplitter 1, allowing a small yet simple magnet attachment system, as generally shown in FIGS. 1A and 1B. Moreover because the magnets do not come into contact with anything else in the system, they additionally cannot transmit external shock and stress in the soft substrate.

Figures 1C, 3B:
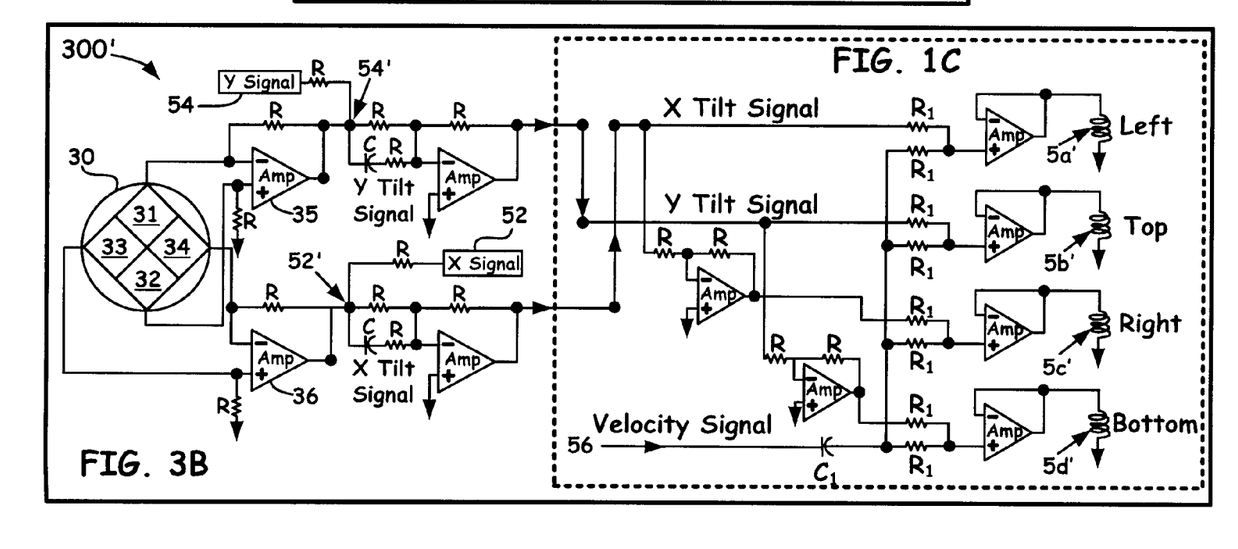
FIG. 3B shows a beneficial light tilt control circuit of the present invention.
Figure 3A:
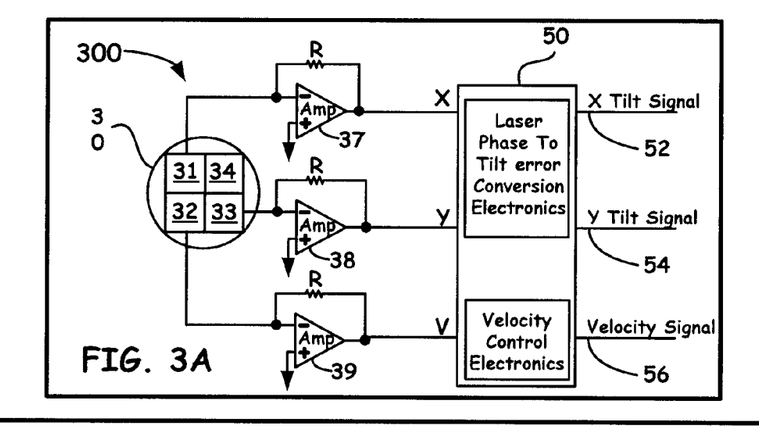
FIG. 3A shows a laser based phase tilt control circuit to be utilized in combination with configurations of the present invention.

Tilt of the beamsplitter 1 can thus provided by the one or more coils (5a', 5b', 5c', and 5d', as shown in example circuit FIG. 1C) by independently directing predetermined induced mismatched and/or matched magnetic forces of often less than about 0.5 Teslas to any of the one or more magnets 5a, 5b, 5c, and 5d. In particular, feedback optical signals are monitored by one or more configured example tilt control systems, as shown in FIGS. 3A and 3B, as to be described in detail later herein, to provide the appropriate low power level signals 52/62 and 54/64 shown in FIGS. 3A and 3B that are increased or amplified so as to induce the magnetic fields that actually result in tilt movements of beamsplitter 1. The velocity of the beamsplitter 1 on the other hand is provided by driving the same coils (e.g., 5a', 5b', 5c', and 5d', as shown in example circuit FIG. 1C) coupled to the magnets 5a, 5b, 5c, and 5d, as shown in FIG. 1B, all at the same time with substantially a same feedback manipulated velocity control signal 63, as shown in FIG. 1C, in order to provide substantially matched magnetic forces to induce steady velocity movement.

FIG. 1C thus shows one such beneficial example resistor (denoted as $R_1$) matrix and coupled operational amplifier (denoted as Amp with corresponding resistors R) servo circuit that can be used to provide the desired velocity and/or tilt movements of beamsplitter 1. In this example configuration that illustrates a basic operation, only four coils 5a', 5b', 5c', and 5d', as shown in FIG. 1C and four corresponding magnets 5a, 5b, 5c, and 5d, as shown in FIG. 1B are needed. While the simplistic design of FIG. 1C in combination with the configurations of FIG. 1A and FIG. 1A are beneficial, it is to be understood that the schematic illustrations are intended to be merely exemplary of one of many other designs which are possible. Nonetheless, with respect to velocity control, such a control signal is often applied substantially equal to all configured coils, e.g., coils 5a', 5b', 5c', and 5d' of FIG. 1C. Using this arrangement, the +Y signal is applied to the top coil 5b' and the −Y signal is applied to the bottom coil 5d'. Correspondingly, the +X signal is applied to the left coil 5a' and the −X signal is applied to the right coil 5c'.

As another arrangement for FIG. 1C, a capacitor $C_1$ (i.e., a high pass filter) can be added to limit beamsplitter 1 travel with respect to a particular moving mirror. Specifically, adding $C_1$ in series with the velocity control signal, as shown in FIG. 1C insures that the DC portion of the velocity control signal does not reach moving beamsplitter 1. The capacitor thus acts like a stiffer flexure as its capacitance is reduced. The added capacitor can be configured to limit beamsplitter 1 movement to shorter distances so as to allow the use of moving mirror bearings that have more friction and allows a configured moving mirror to also be mounted on flexures, if desired, without causing the movement of beamsplitter 1 to become larger.

Accordingly, the circuit of FIG. 1C in combination with the overall design of the system that includes the arrangement of the beamsplitter 1 of the present invention, can provide a desired tilt of up to thousands of arc seconds (e.g., up to about 10,000 arc seconds) and a linear movement at up to about +/−5 millimeters without impacting the adjacent compensator plate 2. Because of this beneficial arrangement, beamsplitter 1 can be mounted substantially close to compensator plate 2, as generally shown in FIG. 1A, and still not come into contact with the compensator plate 2 even as the beamsplitter 1 is induced to move linearly and/or with tilt. Thus, the compensator plate 2 can also be mounted in a resilient flexure-type mount 2' if desired, as shown in FIG. 1A, to protect it from stress with the benefit of not requiring active control (i.e., has no movement means (e.g., magnets) coupled to it) as light just passes through it for optical path correction.

It is also to be appreciated that because of the design of the beamsplitter configuration (i.e., as coupled to the example flexure shown in FIGS. 1A and 1B), the overall mass of the assembly is reduced. The result is that only substantially low forces are needed to move the beamsplitter and this aspect allows the use of the aforementioned small magnets (e.g., about 10 grams per magnet) and small coils of wires (e.g., small flat coils) to induce the magnetic forces. Accordingly, the coils, as discussed in detail below with respect to FIG. 1C, can be small enough to be configured into spiral art work in, for example, a 2 or 4 layer circuit board (not shown) to eliminate the cost and space of separate coils that require manufacturing and then mounting. It is to be appreciated that while a spiral coil is less efficient than a wound coil, the forces are substantially small and the total power is still less than a watt per coil so heat is not a problem.

It is to also be noted that if configured as spiral coils, such coils do not need to have the coupled magnets, e.g., 5b and 5d shown in FIG. 1A, to be inserted into a formed hole in the middle of the spiral coil (which might be done to increase magnetic force). Instead, the magnets (e.g., 5b and 5d) can be placed a distance of, for example, about 2 millimeter away from the circuit board (not shown) to enable a beneficial +/−2 millimeter movement of the beamsplitter 1 and coupled magnets e.g., 5b and 5d, as generally provided by the configuration shown in FIG. 1A.

As another beneficial aspect, the space between the magnets 5b, 5d and resultant coils 5b' and 5d', as generally shown in FIG. 1A, allows the entire beamsplitter assembly (to include the compensating plate) to be interchanged manually or automatically via, for example, motor drive control by the user. Such an embodiment allows a user to select different interchangeable beamsplitter assemblies that are optimized for different light wavelengths. Moreover, this feature allows the easier assembling and servicing of the interferometer.

As stated above, while the novel low cost mounting system of the present invention protects the optical flatness of the optical parts in the assembly shown in FIGS. 1A and 1B, such an arrangement can nonetheless make the start up static tilt problem worse because the soft mounts described herein can drift with time and temperature changes. A novel solution, as disclosed herein in the present invention, is to use a separate optical detection system to measure tilt, especially for larger tilt angles of greater than about 20 arc seconds that is in addition to an optical detection system that measures tilt of desired monitored parts via the measuring of phase shifts in laser signal sine waves. Example systems that incorporate the measuring of tilt via the measuring of phase shifts in a detected laser monitoring signal in addition to control scan velocity and data collection, can be found in the aforementioned cited U.S. Pat. No. 5,883,712, entitled, "INTERFEROMETER OF AN INFRARED SPECTROMETER WITH DYNAMIC MOVING MIRROR ALIGNMENT" and Co-Pending, Co-Filed U.S. application Ser. No. 12/944,512 titled "INTERFEROMETER VELOCITY CONTROL OF BEAMSPLITTER AND MOVING MIRRORS," both to Coffin et al.

Accordingly, the improved tilt control system disclosed herein combines the best features of both tilt measurement systems into a simple compound system that is to be discussed in detail herein. The bottom line is that to enable the incorporation of the beamsplitter assembly as shown and discussed above with respect to the soft mounting configuration and thus to capture its benefits of preserving optical flatness of the coupled optical components, it is important to have a tilt control servo system working before a velocity servo is started so that a large and useful laser signal is obtained to allow the velocity servo control to operate as designed.

Optical Velocity Multiplication

Before turning to the system embodiment(s) of the present invention, the concept of optical velocity multiplication that reduces response time is to be clarified so as to appreciate the benefits of the configurations discussed herein. To aid in the discussion, the reader is directed to the general interferometer schematic of FIG. 1D. With respect to interferometer arrangements of the present invention, FIG. 1D generally shows source radiation being received by a set of optical elements, e.g., beamsplitter 1, compensator plate 2, and reflectors (mirrors 9 and 10), to provide a modulated exit beam.

Figure 1D:
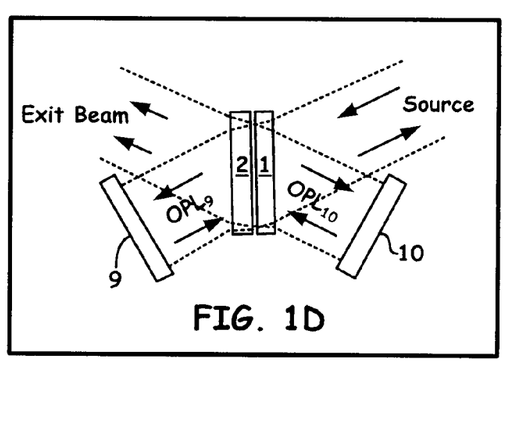
FIG. 1D shows a moving beamsplitter interferometer configuration of the present invention so as to aid in the discussion of optical velocity multiplication.

In general, as the moving beamsplitter 1 moves linearly in a direction toward but at an angle to the configured mirror 10 shown in FIG. 1D (i.e., an angle between the normal of beamsplitter 1 to the normal of a configured mirror (e.g., 10), the optical path length (denoted as $OPL_{10}$) between beamsplitter 1 and mirror 10 is shortened at the same time as the optical path length (denoted as $OPL_9$) to the other mirror (i.e., mirror 9) is lengthened. As a result, the optical path length changes beneficially add, i.e., optically multiply, in manner that is not found in conventional moving mirror systems.

It is to be appreciated however that the desired optical multiplication is reduced somewhat because beamsplitter 1 does move at an angle to both mirrors 9 and 10 so that not all the movement is directly toward the mirror 10. Nonetheless, the present invention capitalizes on this effect via arrangements of the elements shown in FIG. 1D at angles having a range from about 15 degrees up to about 55 degrees, with a preferred angle of about 30 degrees as measured by the angle that the directed light to and from the mirrors 9, 10 makes with respect to the normal of the beamsplitter 1.

As a beneficial non-limiting example, when the beamsplitter 1 to light beam angle is about 30 degrees, the total effect of the optical velocity multiplication is to decrease the beamsplitter velocity about 1.7 times as compared to a conventional moving mirror only interferometer velocity. Correspondingly, such optical multiplication results in about a 1.7 reduction on the total travel needed for the instruments provided herein as compared to conventional systems and furthermore, there is also a tilt correction benefit in that there is about 2 times less physical tilt needed because of the optical multiplication. These smaller physical movements combined with the low weight of the flexure mounted beamsplitter results in lower response time to the control system. The point to take away from this discussion is that in whatever angular arrangement is desirably chosen, because the resultant changes needed to correct a given velocity error is smaller and the time (i.e., response time) to make the smaller correction in velocity is correspondingly less (in addition to the lower physical tilt required), there is a beneficial improvement in overall velocity servo performance. Specifically, resultant lower velocity error results in more stable and lower noise spectra from the analytical instrument.

Figure 2:
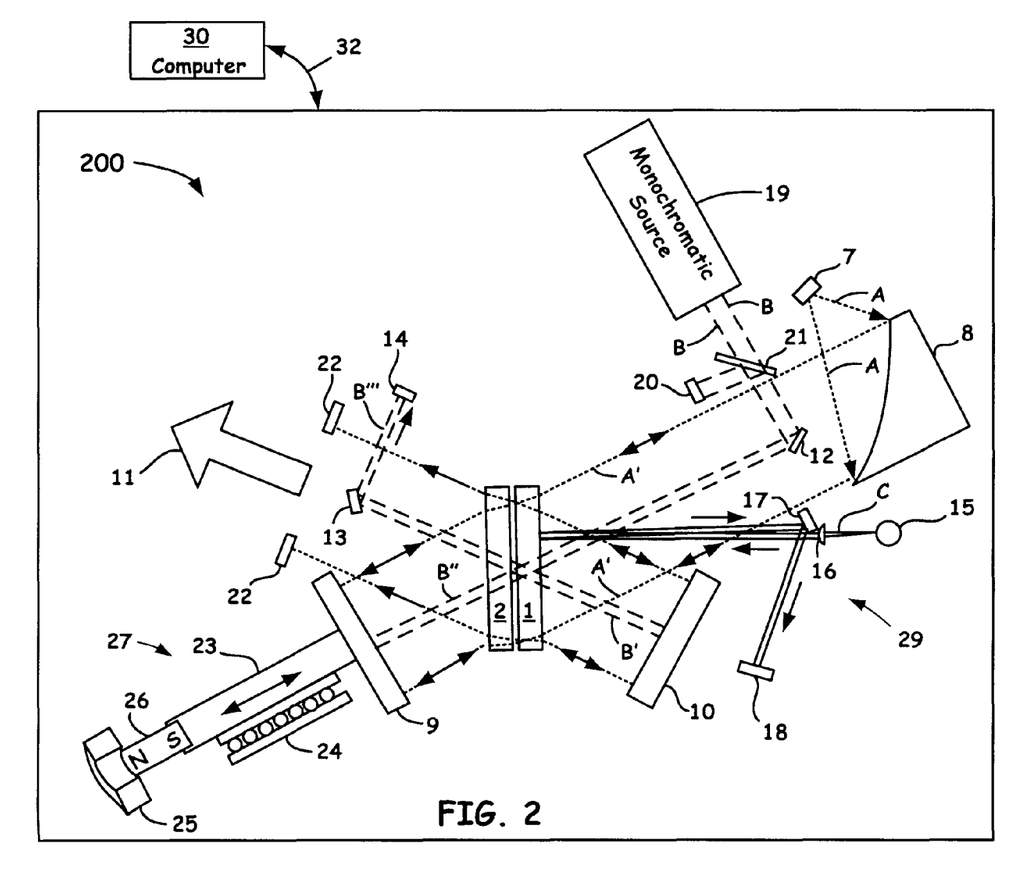
FIG. 2 shows an example dual input beamsplitter tilt control interferometer system of the present invention.

FIG. 2 illustrates an example system of the present invention, generally designated by the reference numeral 200, wherein the optical layout is in the form of a compact yet rugged FTIR spectrometer system utilizing a Michelson interferometer design but with the soft flexure mounting beamsplitter assembly that is generally shown in FIGS. 1A and 1B. It is to be appreciated that while the system shown in FIG. 2 (that includes the wide range tilt control system to be discussed in detail hereinafter) is illustrated in schematic form and comprises a Michelson interferometer type of geometry, it is to be understood that such interferometer systems can be laid out in many other beneficial configurations, as known to those in the art, and that the general illustration of FIG. 2 shown herein is merely intended to be exemplary of such various configurations without limiting it to only that depicted.

It is to be noted that the interferometer 200, and specific components, as shown in FIG. 2, as well as other embodiments disclosed herein, are capable of being operated via a computer or processor 30, which may be a dedicated digital computer or digital signal processor, as known to those of ordinary skill in the art. The coupling 32 between the instrument 200 and the computer 30 is by way of any I/O means for carrying out operations. Often the coupling 32 includes a USB port although the application software can interface with the instrument 200 by any known coupling means as understood by those of ordinary skill in the art. Such coupling means provides programmatic control instruction and operational data (feedback) via the embedded software of the present invention in addition to any other necessary electronic manipulation. The computer 30 is also often electronically coupled to one or more other output devices, such as display screens, printers, etc. and/or one or more other input devices, such as keyboards, internet connections, etc.

It is known to those of ordinary skill in the art that a computer or processor 30, as shown in FIG. 2, in addition to other coupled electronic components can orchestrate the control one or more moving parts of a scanning interferometer system, such as the beamsplitter 1 portion of the novel beamsplitter 1/compensating plate 2 shown in FIG. 2, as well as any other translating optical elements (e.g., reflectors) as utilized in conventional instruments. Such a control means enables the components capable of movement to start, change direction, and move with a desired tilt and/or velocity. In effect, such a computer/processor 30 can determine and thus provide the gain and signals in real time so that a configured circuit can apply necessary drive currents to induce desired movement forces when, for example, provided with desired feedback control detection.

Instructions to start predetermined measurements, the analysis of data, etc., are also often primarily executed by the computer 30 shown in FIG. 2. However, operations can also be executed under instructions stored on a machine-readable medium (e.g., a computer-readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software.

In particular, the computer-readable media can often include local or remote memory storage devices, such as, but not limited to, a local hard disk drive, a floppy disk, a CD-ROM or DVD, RAM, ROM, a USB memory device, and even any remote memory storage device known and understood by those skilled in the art. The invention may also be practiced in distributed computing environments, wherein associated tasks are performed by remote processing devices that are linked through a communications network (e.g., wireless).

Turning back to FIG. 2, the interferometer 200 provides a beam (denoted by the letter A and small dashed line marking) that leads to directed collimated infrared light (denoted as A' as also shown by the small dashed line marking), as enabled by an off-axis reflector 8 in cooperation with a heated infrared source 7. As known to those of ordinary skill in the art, such and infrared source 7 can be chosen from any customized or conventional known source utilized in the field, such as, but not limited to, a wire, metal or ceramic element that is heated to emit a continuous band of optical radiation. By way of operation of the interferometer 200, modulated infrared light 11 exits (as denoted by the large directional arrow) via an output aperture 22.

The example interferometer 200 of FIG. 2, being constructed as a Michelson-type of interferometer, comprises a novel moving beamsplitter 1 and compensator plate 2 arrangement of the present invention disposed between a moving mirror 9 and a fixed mirror 10. However, mirrors 9 and 10 can also be configured as being both fixed mirrors or with either of the mirrors being moveable or with both mirrors 9 and 10 configured to move as a unit all of which is described in Co-pending and Co-filed U.S. application titled "INTERFEROMETER VELOCITY CONTROL OF BEAMSPLITTER AND MOVING MIRRORS.

In the arrangement shown in FIG. 2, the configured moving mirror 9 comprises an overall assembly 27 that can include, for example, mirror 9, support frame 23, and bearing means 24 driven by a motor, such as, for example, a linear motor comprising a coil 25 and a permanent magnet 26. The bearing means 24 for movement can include any conventional linear bearing system configured to translate along a desired longitudinal axis (movement shown by bi-directional arrow on frame 23) with the restriction that it must not pitch or yaw more than about 50 arc seconds (to prevent the exit beam from moving relative to either the sample or light detector). Example bearing means 24, as shown in FIG. 2, to provide movement of the mirror assemblies 27 of the present invention can include, linear rolling ball bearings, air bearings, sliding bearings, and/or flexure bearings.

Such an example compound system 200, as shown in FIG. 2, allows for a moving mirror long-stroke configuration that is heavier without compromising the performance of the overall system. In particular, the configuration as shown in FIG. 2, allows very high scan lengths to be collected (limited only by the size of the bearing and motor) to provide for 4.0 cm$^{-1}$ to about 0.05 cm$^{-1}$ or greater resolution (e.g., for gas analysis). If desired, the lightweight beamsplitter of the present invention can alone provide the benefits of low mass, rapid control and shipping shock protection while simultaneously capable of collecting data at any scan length similar to that of conventional interferometers. However, another beneficial embodiment of the present invention is a configuration wherein the velocity control signal is applied to both of the aforementioned optically monitored moving parts, i.e., mirror 9 and beamsplitter 1 to provide for added beneficial resolution.

By velocity controlling both moving parts, the response time with respect to velocity error signals can be reduced so as to beneficially reduce servo velocity errors faster than if only one of the moving parts is velocity controlled. The reduction in response time allows the changing of velocity and direction of travel during predetermined scans to be finished in time frames (e.g., less than about 10 milliseconds) that are less than conventional moving reflector (mirror) systems. Such a reduction is of value when many short scans are needed to observe rapidly changing samples.

A single conventional velocity control servo can thus be configured to control both the moving beamsplitter 1 and a moving mirror 9 using the natural centering force of the resilient flexure discussed above to allow the beamsplitter 1 to make small controlled strokes while the moving mirror 9 with a non-flexure bearing makes the long controlled strokes. In this arrangement, the control system of the present invention has the fast response time of the moving beamsplitter and the long stroke of a linear bearing moving mirror 9, the result of which improves the overall active velocity control design depicted herein to enable a system that is similar to, but an improvement of, conventional long stroke systems that provides high resolution.

As another beneficial arrangement, as similarly discussed above with respect to FIG. 1C, the velocity control servo signal can be sent through a high pass filter (i.e., a capacitor) before it is used to drive the moving beamsplitter 1 while the moving mirror 9 is controlled with a configured conventional velocity control signal. Such a configuration enables the moving beamsplitter 1 to rapidly change velocity to improve velocity control and at the same time limit the moving beamsplitter 1 stroke even if moving mirror 9 is mounted on a flexure or high friction linear bearing. As an added arrangement, the high pass filter can be changed by changing the capacitor size to control the moving beamsplitter 1 stroke length compared to the moving mirror stroke length.

Again turning back to FIG. 2, the translational position and correlated velocity of the moving beamsplitter 1, in addition to tilt, can thus, as one arrangement, be detected by incorporating a monochromatic emission source 19 (e.g., laser) which provides an output beam (as denoted by the letter B and larger dashed markings) configured to determine not only the position and velocity of the beamsplitter 1 but also any other moving optical component in the example system of FIG. 2. In operation, beam B is directed through a configured beamsplitter 21 and thereafter further directed to the front face of beamsplitter 1 by a mirror 12. Upon being received by the front face of beamsplitter 1, a reflected portion (denoted as B') off of beamsplitter 1 is thereafter received by fixed mirror 10 arranged to retro-reflect beam B' back towards beamsplitter 1/compensator plate 2. A portion of beam B is also transmitted through beamsplitter 1/compensator plate 2, as denoted by B", and directed to the fixed mirror 9, wherein it is also retro-reflected back to beamsplitter 1/compensator plate 2.

The recombination of the portion of the beam B" that passes through beamsplitter 1/compensator plate 2 and thereafter reflected by mirror 9 with the portion of the beam B' directed to and reflected off of fixed mirror 10, provides an output beam (denoted as B''') now having an interference pattern that contains desired optical position and velocity information. Thus, monitoring beam B''' enables the speed and position and tilt of a desired face of moving beamsplitter 1 to be precisely determined by counting the peaks and valleys in the amplitude of the beam B''' as directed by reflector 13 to an interrogating detector 14 (often a quad detector as detailed herein).

As one example embodiment, when configured as a quad detector 14, one of the quadrants can be configured to provide a sine wave signal, which is representative of the of the position and velocity of beamsplitter 1, the signal of which is coupled to velocity control measuring electronics (not shown) for processing. To provide tilt information, the quadrants in combination can be spaced apart, as detailed below, so that the deviation of a perpendicular of any moving part of the system to a given longitudinal axis can be determined by differences in the phases of the interference fringes as detected by the different quadrants.

It is to be noted that the moving beamsplitter 1 interferometer 200 arrangement, as shown in FIG. 2, does have particular aspects that are not found in conventional interferometer systems as a result of providing desired movements of beamsplitter 1. For example, it is to be noted that as beamsplitter 1 moves linearly during a scanning process, the exiting modulated infrared light beam 11 in addition to the beam (i.e., beam B''') that is monitored for speed and position of moving mirror 1 both translate laterally, i.e., the linear translated distance of beamsplitter 1 results in the exiting beam 11 and beam B''' being sideways displaced a physical distance about one half as far as the distance that beamsplitter 1 has moved.

The moving beamsplitter 1 of the present invention can be, but not necessarily, designed to have a total linear travel, as integrated into the embodiments disclosed herein, at up to about 10 millimeters (i.e., +/−5 millimeters). Thus, the translational movements of beam 11 can be minimized by driving the beamsplitter to desired scan lengths so as to provide for acceptable exit beam 11 lateral movements. For example, an example total scan length for beamsplitter 1 can be configured at about 2 millimeters so as to provide for a translational movement of beam 11 of less than about 1 millimeter.

As an alternative design for the modulated exiting beam 11 of broadband infrared light, the larger diameter of between about 20 millimeters up to about 50 millimeters for beam 11 is large enough in diameter so that the deleterious movement effect in the example discussed above, i.e., the example 1 millimeter lateral movement due to a maximum 2 mm translation of beamsplitter 1, can be eliminated by limiting the size of the exiting beam 11 via fixed output aperture 22 at the exit location, as shown in FIG. 2. Limiting apertures such as conventional mirrors or lens systems as configured in the light beam exiting the interferometer can also become the fixed output aperture 22 through proper design. Any of such fixed aperture arrangements allow the rest of the spectrometer arrangements disclosed herein, such as the system shown in FIG. 2, to be left unchanged.

It is to be noted that while the modulated exit beam 11 can be tailored with dimensions so as to not be impacted by the movement of beamsplitter 1, the normally smaller diameter for the monochromatic source 19, which also makes a resultant sideways motion when moving the beamsplitter 1, can additionally be problematic because the monitored beam B''' can fall off the desired quadrant of detector 14. An example arrangement to overcome this potential problem is to expand the beam B provided by source 19 to about 3 millimeters or greater in diameter (e.g., when moving the beamsplitter at up to about 2 millimeters in total travel) in order to cover a required area of detector 14.

An alternative example design is to use the returning laser light beam that is directed back to the monochromatic light source 19. Such a beam has the same optical velocity and position information as the exiting beam B''' with the benefit that it does not translate sideways even as beamsplitter 1 moves. This returning beam can be received upstream by beamsplitter 21 designed to direct a portion (denoted as B'''' in FIG. 2) of the received beam to a second detector 20 (e.g., another quad detector) often but not necessarily mounted near monochromatic source 19.

FIG. 3A shows a beneficial example velocity and phase tilt circuit, generally designated by the reference character 300, which incorporates a quad detector 30 (e.g., one of either of example detectors 14, 20 of FIG. 2) to collect the modulated light at any of the arranged example locations shown in FIG. 2. The circuit of FIG. 3B thus shows a detector having detection quadrants 31, 32, 33, 34, which are arranged to direct signals to subsequent circuitry 37, 38, 39, and 50 to provide the velocity control 56 as well as the X (52), Y (54) tilt signals that can be utilized by complimentary servo circuits.

As an example operation, the signal from quadrant 32 can be used to provide a sine wave signal (denoted as V) to the velocity control electronics so as to initiate a velocity signal 56 to be received by a velocity servo circuit, such as the pertinent portion of the circuit shown in FIG. 1C. The signal from quadrant 32 is also capable of being used to provide a common reference signal to compare the phase of the signals resultant from predetermined quadrants of detector 30. Thus, the circuitry of FIG. 3B can use the phase difference in the optical signals of quadrants 31 and 32 to measure, for example, tilt in the X axis and quadrants 33 and 32 to measure the Y axis tilt. Quadrant 34 in this example is not used.

It is to be appreciated that the tilt errors of the mirrors 9, 10 and the beamsplitter 1, as shown in FIG. 2, are required to be less than about 50 arc seconds before the circuitry shown in FIG. 3A can operate, which can be difficult based on the soft mounting structures of the present invention. To enable the operation within the design parameters of the circuit shown in FIG. 3A, the present invention thus combines a wide range reflected spot tilt control system of the present invention with, for example, circuitry and optical configurations that incorporates phase information so as to correct tilt errors even as large as 10,000 arc seconds and above.

Wide Range Tilt Control Embodiment

As noted above in the general description discussion, the low cost mounting system of the present invention protects the optical flatness of the critical parts but also makes the start up static tilt problem worse because the soft mounts can drift with time and temperature change. In particular, because the mounts that hold, for example, the beamsplitter and compensator plate, are relatively soft the assembly, as shown in FIG. 1A, often tilts as temperature and system orientation changes. The present invention provides a novel solution to this effect by incorporating an additional optical system that measures larger tilt angle errors to be used in combination with phase shift measurements, so as to provide for a means of enabling the optimum use of the soft mounted optical components, as described herein.

Turning yet again to FIG. 2, the wide range tilt system, generally shown by the reference character 29 and accompanying arrow, includes an optical source 15 that can either be selected from an incoherent source, a laser source (e.g., a laser diode, gas laser, solid state laser, etc.) or an LED (light emitting diode of various wavelengths) that is often focused via a first optical component 16 (e.g., lens) and appropriately directed (shown with a directional arrow) at beamsplitter 1. The beam from optical source 15 is then returned (also shown with a directional arrow) at a prescribed angle so as to be redirected by a second optical component 17 (e.g., a reflector) in order to be collected by an optical detector 18 (e.g., another configured quad detector). Such a collected light is often configured with a beam diameter of about 1 millimeter as received at the input surface of the detector 18, the surface detection area of which is often about 2 millimeters in size.

Thus, as the detected surface of the beamsplitter tilts, the spot residing on, for example, the quadrants of detector 18, is induced to move so as to cause different amounts of light to be measured on respective quadrants of detector 18. Such a detected optical beam is not required to be modulated and is not necessarily provided by a monochromatic source, as stated above, as the interrogating beam can be any optical source (often focused) as long it is within a predetermined detection wavelength range of the detector 18. The position of the collected optical beam on the surface of the quad detector 18 is therefore measured by detecting the differences in the light levels reaching resultant pairs of configured detectors, as to be described for the detector 30 configured in FIG. 3B.

For example, specifically turning now to the circuit 300' in FIG. 3B, the differences in the light levels on two configured quadrants of the detector 30 above and below each other (e.g., 31, 32) can be used to measure the Y tilt and the differences in the light levels on the two quadrants mounted side by side (33, 34) can be used to measure the X tilt. Thereafter, the differences in the light levels detected by quadrants 31 and 32 can be manipulated by, for example, amplifier 35, with amplified signals being used to drive the coupled (e.g., via resistive coupling or other means known in the art) subsequent circuitry of FIG. 1C that includes configured coils $5b'$ and $5d'$ (as also now shown in the dashed box within FIG. 3B for ease of reading). Correspondingly, induced magnetic forces are provided by coils that interact with magnets $5b$ and $5d$ respectively, as shown in FIG. 1B, so as to move the beamsplitter 1 of the present invention up and down.

In addition, the differences in the light levels interrogated by quadrants 33 and 34 can be manipulated by, for example, amplifier 36, to also drive relevant portions of the coupled subsequent circuitry of FIG. 1C (shown within the dashed box) that includes configured coils $5a'$ and $5c'$. Also correspondingly, induced magnetic forces are provided by such coils that interact with magnets $5a$ and $5c$ respectively, as shown in FIG. 1B, to move the beamsplitter 1 of the present invention from side to side.

Thus, the forces generated by the configured coils (e.g., $5a'$, $5b'$, $5c'$, and $5d'$, as shown in example circuit FIG. 1C as coupled to the circuit 300' in FIG. 3B) and magnets (e.g., $5a$, $5b$, $5c$, and $5d$, as shown in FIG. 1B) via signals provided by circuit 300' in FIG. 3B, enable tilt of the beamsplitter 1 in the X and Y axis to align the flat surfaces in the interferometer so that a velocity control servo circuitry, as shown by the relevant portion of FIG. 1C, can start operating to then beneficially enable the moving mirror 9 to scan and generate the desired optical data.

It is to be noted that a beneficial aspect of having tilt control of the beamsplitter itself in the manner describer herein is the fact that tilting of the beamsplitter creates the same optical correction with ½ the angular movement (due to bisecting the angles of the mirrors 9, 10 in FIG. 2) of conventional systems so as to allow for beamsplitter tilt correction to be made in less time, the result of which improves the overall performance of the wide range system disclosed herein and overall interferometer performance in an environment that includes vibration from other equipment in the area.

Example Method of System Operation

On power up, an optical phase velocity and tilt control system as disposed within the overall system 200 of FIG. 2 is inoperative and thus produces no output signal. However, the wide range tilt correction system 29 of FIG. 2 as coupled to, for example, similar circuitry as shown in FIG. 3B, provides a signal as soon as the source 15 of system 29 starts operating. In less than about 1 second, a tilt error that can be greater than about 10,000 arc seconds can be reduced to less than about 5 arc seconds so that there is a strong optical signal provided for the velocity servo circuit before it can attempt to operate.

After such optical signals are sufficiently full sized, the velocity servo circuit portion (e.g., as shown in FIG. 3A) can start and can (but does not have to) turn on the optical phase tilt control system (as shown in box 50 of FIG. 3A), as discussed above. The output signals 52, 54 of the circuit shown in FIG. 3A can thus be added to the error signals provided by the circuit of FIG. 3B to reduce the beamsplitter tilt error to less and about one arc second so as to improve the stability of the operating interferometer of the present invention.

FIG. 3B therefore shows a circuit mode wherein optical phase control tilt signals 52 and 54 provided by the circuit of FIG. 3A is inserted, as shown respectively by reference characters 52' and 54', into a newly configured wide range electronic circuit, as generally referenced by the numeral 300' in FIG. 3B. If the gain of the tilt error signal is lowered (at Operational Amps 35 and 36) from a normal gain level (i.e., that which starts X and Y servo oscillation) of the wide range servo by a factor of about a factor of 3, the wide range servo continues to operate normally but with a slightly slower response. With the wide range gain lowered, the error signal provided by the circuit of FIG. 3A can be added at points 52' and 54' and its gain adjusted normally so that the total system is stable and the beamsplitter responds to the error signal of both measurement systems with no need for extra control software to control the gains of either tilt measurement system.

The total start up time of both the wide range circuit of FIG. 3B and the optical phase circuit of FIG. 3A can, as a combined system, be less than about 2 seconds even if the beamsplitter of the present invention has a tilt error of several thousand arc seconds at the beginning of the start up process. Other control strategies that use software to adjust gain of the circuits as the system is in different operating modes (e.g., startup, scan retrace, data collection, etc.) can also be utilized herein where and when desired. However, such additional control software is often not needed as the present invention provides for a very simple control system that does not necessarily require added software or firmware.

On the other hand, in the case of large amounts of external vibration, it may be helpful to use software to control the gain of the wide range tilt control system and optical phase control system, as disclosed herein, so as to increase the performance of the system as a whole by increasing the gain of the wide range system when the optical phase system is off until the wide range tilt error is low enough to allow the optical phase signal to first be accurate and reliable. Only then is the more sensitive optical phase based tilt error circuitry utilized by changing the gains of the two different tilt error measurement systems. Such beneficial software can thus allow dual tilt error signals to be used in, for example, a moving vehicle.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A flexure mounted moving beamsplitter assembly, comprising:
   a beamsplitter substrate;
   a resilient membrane coupled about the periphery of said beamsplitter substrate and further coupled to a support structure; wherein said resilient membrane minimizes induced external stresses directed through said support structure and thus aids in preserving optical flatness of said beamsplitter substrate; and
   a plurality of magnetic means coupled to a predetermined surface of said beamsplitter substrate; and
   a plurality of coils configured to couple matched and/or mismatched predetermined magnetic forces with said plurality of magnetic means, wherein said matched and/or mismatched predetermined forces enable linear and tilting movements of said beamsplitter substrate,
   wherein said beamsplitter assembly is disposed within an interferometer.

2. The flexure mounted moving beamsplitter assembly of claim 1, wherein the mass of said resilient membrane with respect to the mass of said substrate enables low applied magnetic forces by said plurality of coils to move said beamsplitter substrate.

3. The flexure mounted moving beamsplitter assembly of claim 1, wherein said resilient membrane is configured from a material that enables movement of up to about +/−5 millimeter of linear displacement and to provide a retarding force resultant from about +/−5 millimeter of linear displacement.

4. The flexure mounted moving beamsplitter assembly of claim 1, wherein said material of said resilient membrane comprises at least one material selected from: fabric, polymers, plastics, Mylar, metals, and paper.

5. The flexure mounted moving beamsplitter assembly of claim 1, wherein said resilient membrane is configured with corrugations.

6. The flexure mounted moving beamsplitter assembly of claim 1, wherein said plurality of magnetic means comprises permanent magnets coupled by adhesive to the edge of an input surface of said beamsplitter substrate.

7. The flexure mounted moving beamsplitter assembly of claim 1, wherein said plurality of coils are configured with a spacing from said magnetic means to enable +/−2 millimeter movement of said beamsplitter substrate.

8. The flexure mounted moving beamsplitter assembly of claim 1, wherein said assembly further comprises a compensator plate additionally configured with a respective resilient membrane arranged about the periphery, and wherein said compensator plate is additionally coupled to said support structure.

9. An interferometer comprising:
   a flexure mounted moving beamsplitter assembly, comprising:
   a beamsplitter substrate;
   a resilient membrane coupled about the periphery of said beamsplitter substrate and further coupled to a support structure; wherein said resilient membrane minimizes induced external stresses directed through said support structure and thus aids in preserving optical flatness of said beamsplitter substrate; and
   a plurality of magnetic means coupled to a predetermined surface of said beamsplitter substrate;
   a plurality of coils configured to couple matched and/or mismatched predetermined magnetic forces with said plurality of magnetic means, wherein said matched and/or mismatched predetermined forces enable linear and tilting movements of said beamsplitter substrate; and
   a control system configured to provide feedback controlled signals to one or more of said plurality of coils to induce said matched and/or mismatched predetermined magnetic forces.

10. The interferometer of claim 9, further comprising:
    a first reflector configured to respectively receive and return a first portioned beam of a source along a first optical path length; and
    a second reflector configured to respectively receive and return a second portioned beam of a source along a second optical path length; wherein said beamsplitter substrate is configured to receive a beam of radiation from said source so as to provide said first and second portioned beams.

11. A dual input tilt controlled interferometer, comprising:
    a first plane reflector configured to respectively receive and return a first portioned beam of a source along a first optical path length;
    a second plane reflector configured to respectively receive and return a second portioned beam of a source along a second optical path length;

a resiliently mounted beamsplitter configured to receive a beam of radiation from said source so as to provide said first and said second portioned beams;

a plurality of motors coupled to said resiliently mounted beamsplitter configured to drive linear movement and tilting movements about X and Y axes of said resiliently mounted beamsplitter; and a dual input tilt control system comprising:

a laser phase tilt control system configured to provide a first measurement of X, Y tilt of said resiliently mounted beamsplitter and to provide a feedback controlled velocity control signal, a first feedback controlled X tilt control signal and a first feedback controlled Y tilt control signal; and an autocollimation tilt control system configured to provide a second, independent measurement of X, Y tilt of said resiliently mounted beamsplitter and to provide a second feedback controlled X tilt control signal and a second feedback controlled Y tilt control signal;

wherein said dual input tilt control system is configured to apply said feedback controlled velocity control signal to said plurality of motors to provide velocity and position control of said resiliently mounted beamsplitter and to apply said first and second feedback controlled X tilt control signals and said first and second feedback controlled Y tilt control signals to one or more of said plurality of motors to provide X, Y tilt control of said resiliently mounted beamsplitter, and further wherein said velocity and position control and said X, Y tilt control enable optical path length differences between said first optical path length and said second optical path length that in combination provide an interrogating interferogram of the input source beam radiation at a configured exit of said interferometer.

12. The dual input tilt controlled interferometer of claim 11, wherein said laser phase tilt control system comprises a laser phase tilt control circuit and said autocollimation tilt control system comprises an autocollimation tilt control circuit and further wherein said first and second feedback controlled X tilt control signals are summed together at a first node within said autocollimation tilt control circuit prior to being applied to one or more of said plurality of motors and said first and second feedback controlled Y tilt control signals are summed together at a second node within said autocollimation tilt control circuit prior to being applied to one or more of said plurality of motors.

13. The dual input tilt controlled interferometer of claim 12, wherein said autocollimation tilt control circuit is configured such that the gain of said second feedback controlled X tilt control signal and the gain of said second feedback controlled Y tilt control signal are each lowered prior to being summed by up to about a factor of 3 as compared to the gain used if the first and second feedback controlled X tilt control signals were not summed together and if the first and second feedback controlled Y tilt control signals were not summed together.

14. The dual input tilt controlled interferometer of claim 11, wherein said laser phase tilt control system is configured to correct X, Y tilt errors of less than about 50 arc seconds of said resiliently mounted beamsplitter and said autocollimation tilt control system is configured to correct X, Y tilt errors of up to about 10,000 arc seconds of said resiliently mounted beamsplitter.

15. The dual input tilt controlled interferometer of claim 11, wherein said autocollimation tilt control system comprises an autocollimation tilt measurement system comprising an optical source and an optical detector, said autocollimation tilt measurement system configured to provide said second, independent measurement of X, Y tilt of said resiliently mounted beamsplitter.

16. The dual input tilt controlled interferometer of claim 15, wherein said autocollimation tilt measurement system is configured such that a beam from said optical source is reflected by said resiliently mounted beamsplitter onto said optical detector and differences in the amount of light detected by different regions of said optical detector provide said second, independent measurement.

17. The dual input tilt controlled interferometer of claim 16, wherein said optical source is selected from an incoherent source, a laser source or a light emitting diode.

18. The dual input tilt controlled interferometer of claim 11, wherein said resiliently mounted beamsplitter is resiliently mounted via a flexure membrane arranged about the periphery of said beamsplitter.

19. The dual input tilt controlled interferometer of claim 11, wherein said plurality of motors comprises a plurality of permanent magnets coupled to an input face of said resiliently mounted beamsplitter and a plurality of coils, each coil configured to apply a magnetic force to a respective permanent magnet.

20. The dual input tilt controlled interferometer of claim 11, wherein said autocollimation tilt control system is configured to reduce X, Y tilt errors of about 10,000 arc seconds or more down to less than about 5 arc seconds prior to operation of said laser phase tilt control system.

21. The dual input tilt controlled interferometer of claim 11, wherein said autocollimation tilt control system is configured to be operational in less than about 1 second, even if said laser phase tilt control system is not operating.

22. The dual input tilt controlled interferometer of claim 11, wherein said dual input tilt control system is configured to provide a total start up time for said interferometer of less than about 2 seconds.

* * * * *